Sept. 24, 1946.  H. E. MILLS  2,408,331
AIR-CONDITIONED ELECTRIC COOKING OVEN
Filed April 12, 1943
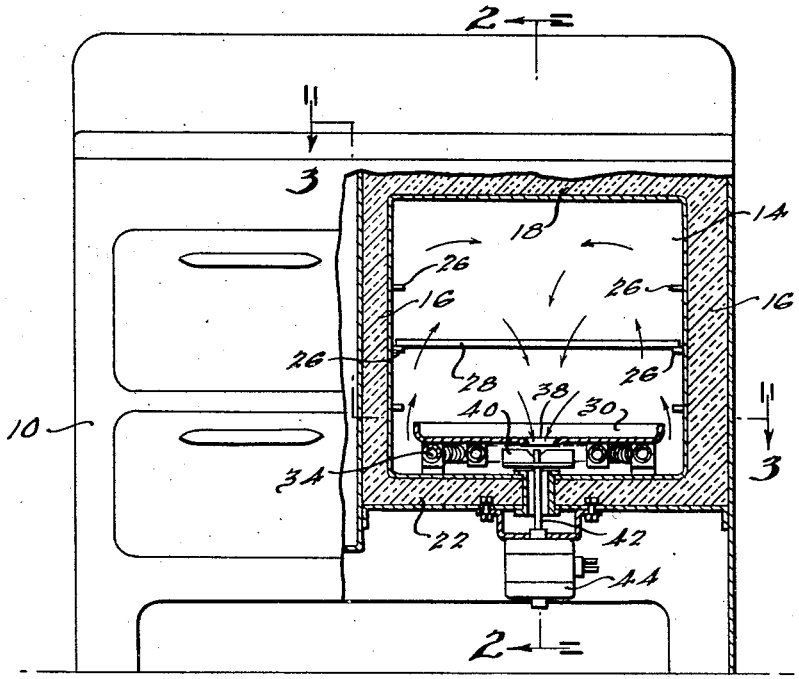
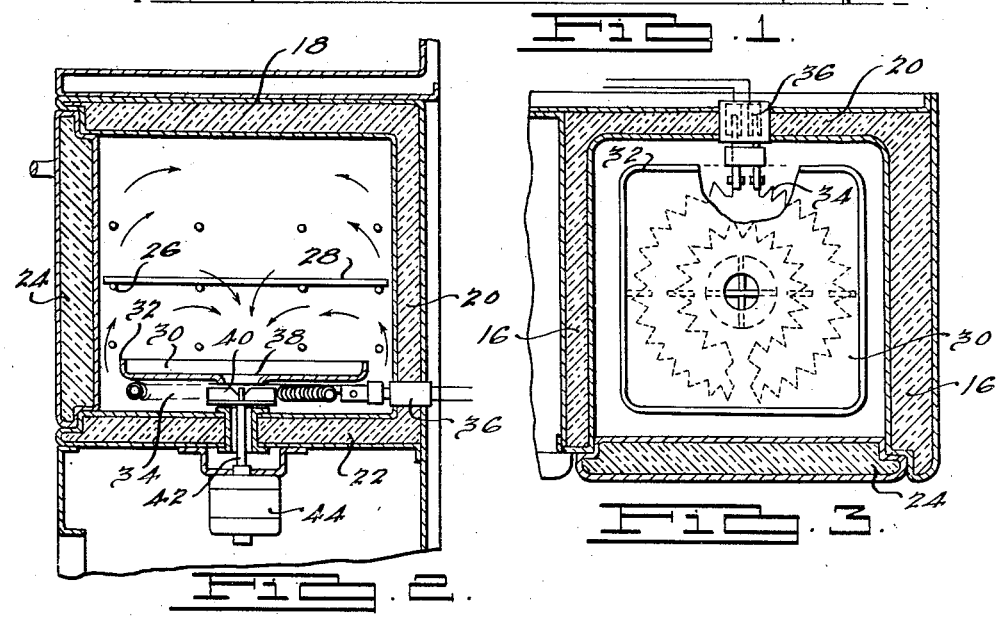
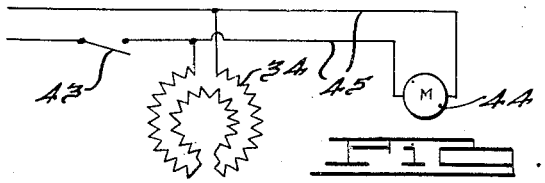
INVENTOR.
Herbert E. Mills.
BY
Edwin J. Balluff Patented Sept. 24, 1946

2,408,331

UNITED STATES PATENT OFFICE 2,408,331

AIR-CONDITIONED ELECTRIC COOKING OVEN

Herbert E. Mills, Detroit, Mich., assignor, by mesne assignments, to Mills Engineering Company, Detroit, Mich., a partnership Application April 12, 1943, Serial No. 482,787

2 Claims. (Cl. 219—35)

This invention relates to air conditioned electric cooking ovens and has particular reference to a novel and more useful oven which is better and more efficiently adapted to cook foods.

A principal object of the invention is to provide an oven of the character referred to in which the oven temperature is more uniformly controlled and in which the baking of food is carried out in a more efficient manner with much better cooking results than it has heretofore been possible to obtain.

Another object of the invention is to provide an electric oven with heating means therein and with a fan for circulating air throughout the oven and over the heating means and the food to be cooked so as to provide fairly uniform temperature conditions throughout the oven space.

Other objects and advantages of the invention will be apparent from a consideration of the following specification taken in conjunction with the accompanying drawing, of which there is one sheet and wherein:

Fig. 1 is a front elevational view, partly broken away, of an electric stove embodying one form of my invention;

Fig. 2 is a vertical sectional view taken in a plane along the line 2—2 of Fig. 1, looking in the direction of the arrows;

Fig. 3 is a horizontal sectional view taken along the staggered line 3—3 of Fig. 1, looking in the direction of the arrows; and Fig. 4 is a diagrammatic illustration of the wiring circuit.

In the embodiment of the invention selected for purposes of illustration, a stove 10 is provided with a cooking oven 14 defined preferably by insulated side walls 16, top wall 18, back wall 20, bottom wall 22, and insulated door 24 which provides access to the interior of the oven. Pairs of shelf supporting brackets 26 may be suitably affixed to the side walls 16 of the oven for suitably supporting wire racks or shelves 28, such shelves or racks 28 being preferably formed of wire so as to permit the free circulation of air throughout the space in the oven.

The oven 14 is provided with a false bottom comprising a metal baffle or plate 30 which is horizontally arranged and suitably supported slightly above the bottom wall 22 of the oven. The plate or baffle 30 may have its edges turned upwardly as indicated at 32, such edges being in spaced relation with the side walls, the rear wall, and the door of the oven. The baffle or plate 30 cooperates with the bottom wall 22 of the oven to define a space in which suitable heating elements 34 are positioned, such elements being diagrammatically illustrated as a coiled resistance element or elements which is arranged in spaced relation with the wall 22 and plate 30 and insulated therefrom. The ends of the element 34 are suitably connected to current conductors which may be mounted in an insulating block 36 mounted in the rear wall 20 of the oven. The plate or baffle 30 at its center is provided with an opening 38 which comprises an air opening and permits air to circulate from one side of the baffle or plate to the other side thereof.

Immediately below the opening 38 a fan or blower 40 is positioned. The fan 40 may consist of a series of radially extending blades mounted on the upper end of a vertically extending drive shaft 42 driven by an electric motor 44. A suitable air seal may be employed between shaft 42 and the bottom oven wall through which such shaft projects. During operation of the motor the fan 40 is adapted to discharge air laterally between the baffle 30 and the bottom wall 22 and to effect a circulation of air over the coils of the heating element 34 and thence upwardly between the edges of the baffle 30 and the spaced inside surfaces of the oven and, after circulating around through the oven, downwardly to the intake of the fan through the opening 38 in the baffle. It will be observed that the air discharged by the fan will flow laterally and from the fan in all directions below the baffle 30 and thence upwardly around the entire periphery of the edge 32 of the baffle 30. Any food to be cooked supported upon the shelf 28 will have all of its exterior exposed to the circulation of heated air under the influence of the fan 40, and in addition will be subjected to the radiant heat emanated by the baffle 30 which being metal will absorb heat directly from the heating element 34 and radiate the same throughout the space in the oven.

A manually operated switch 43 may be employed in the circuit 45 in which the heating element 34 is arranged. This switch may include a thermostatically controlled means for regulating the heat output of the heating element 34 responsive to a preselected temperature condition desired for the oven 14. The fan motor 44 may be connected in the circuit 45 and controlled by the switch 43.

While the invention has been described with some detail, it is to be understood that the description is for the purpose of illustration only and is not definitive of the limits of the inventive idea. The right is reserved to make such changes in the details of construction and arrangement of parts as will fall within the purview of the attached claims.

I claim:

1. An electric cooking stove comprising an oven defined by insulated walls, a generally horizontal baffle arranged in the lower part of said oven and in closely spaced relationship with the bottom wall thereof, said baffle having its surrounding side edges arranged in spaced relationship with the side walls of said oven to define a blower discharge opening therebetween extending entirely around said baffle and said oven, said baffle having an unobstructed central opening forming a blower inlet, a blower positioned below said central opening and operable to effect the continuous circulation of oven air downwardly through said blower inlet, laterally in all directions below said baffle, thence upwardly through said discharge opening on all sides of said oven into the oven space thereabove and thence back to said blower inlet, a flat electric heating element arranged below said baffle in the path of the air circulated by said blower, and operable for heating the air circulated by said blower, thereby to heat said oven for cooking food therein, and an electric motor arranged below said bottom oven wall and connected to said blower for operating the same only when said heating means is operable, said heating element substantially surrounding said blower and being arranged in substantially the same general plane thereof.

2. An electric cooking stove comprising an oven defined by insulated walls, a generally horizontal baffle arranged in the lower part of said oven and in closely spaced relationship with the bottom wall thereof, said baffle having its surrounding side edges arranged in spaced relationship with the side walls of said oven to define a blower discharge opening therebetween extending entirely around said baffle and said oven, said baffle having an unobstructed central opening forming a blower inlet, a blower positioned below said central opening and operable to effect the continuous circulation of oven air downwardly through said blower inlet, laterally in all directions below said baffle, thence upwardly through said discharge opening on all sides of said oven into the oven space thereabove and thence back to said blower inlet, a flat electric heating element arranged below said baffle in the path of the air circulated by said blower, and operable for heating the air circulated by said blower, thereby to heat said oven for cooking food therein, an electric motor connected to said blower for operating the same, and a common circuit in which said motor and heating element are arranged so that said blower is operable only when said heating element is energized, said circuit including a switch, said heating element substantially surrounding said blower and being arranged in substantially the same general plane thereof.

HERBERT E. MILLS.